United States Patent [19]
Nakamura

[11] Patent Number: 5,653,208
[45] Date of Patent: Aug. 5, 1997

[54] ENGINE IGNITION CONTROL

[75] Inventor: Kazuhiro Nakamura, Hamamatsu, Japan

[73] Assignee: Sanshin Kogyo Kabushiki Kaisha, Hamamatsu, Japan

[21] Appl. No.: 574,621

[22] Filed: Dec. 19, 1995

[30] Foreign Application Priority Data

Dec. 27, 1994 [JP] Japan .................. 6-325352

[51] Int. Cl.⁶ ........................................... F02P 5/00
[52] U.S. Cl. ........................................... 123/413
[58] Field of Search ................. 123/413, 179.5, 123/416, 417, 602, 179.3

[56] References Cited

U.S. PATENT DOCUMENTS

| | | | |
|---|---|---|---|
| 4,694,799 | 9/1987 | Yagi et al. | 123/179.5 |
| 4,858,585 | 8/1989 | Remmers | 123/602 |
| 4,986,239 | 1/1991 | Oishi | 123/413 |
| 5,101,780 | 4/1992 | Jones | 123/179.5 |
| 5,159,916 | 11/1992 | Isogawa | 123/602 |
| 5,199,394 | 4/1993 | Hartmann et al. | 123/179.1 |
| 5,219,397 | 6/1993 | Jones | 123/179.3 |

Primary Examiner—Raymond A. Nelli
Attorney, Agent, or Firm—Knobbe, Martens, Olson & Bear, LLP

[57] ABSTRACT

A spark advance system for an internal combustion engine having a conventional throttle operated spark advance that provides a spark advance related to load. In addition, an arrangement is provided for using an alternate spark timing during start-up so as to provide optimum spark timing under start-up conditions.

16 Claims, 7 Drawing Sheets

ENGINE IGNITION CONTROL

BACKGROUND OF THE INVENTION

This invention relates to an engine ignition control and more particularly to an improved arrangement for controlling the spark timing of an engine during start-up conditions.

As is well known, spark-ignited internal combustion engines incorporate a spark advance system which is provided for controlling the time of firing of the spark plug in response to engine running conditions. As should be readily apparent, the optimum time of spark plug firing is important to ensure good engine performance.

It is well known that the optimum spark timing for an engine depends upon a variety of factors and primarily upon the load on the engine and the engine speed. Therefore, many types of conventional engine ignition systems include a spark advance mechanism that interrelates with the throttle valve of the engine so as to adjust the spark timing in response to the throttle valve position. The throttle valve position is directly related to the engine load, as should be readily apparent.

Most of these spark timing systems include a linkage system that is interrelated between the throttle mechanism and the spark advance mechanism. The spark advance mechanism normally includes a pulser coil mounted on a timing plate in proximity to the engine output shaft. This timing plate is rotatably adjusted and cooperates with a permanent magnet affixed to the engine output shaft for generating a pulse signal at a specific crankshaft angle. By interrelating the movement of the timing plate and the throttle valve, the appropriate spark timing may be generated for a given engine load condition.

Although these systems are particularly useful and effective, there are some running conditions wherein the spark timing provided by this mechanism is not optimum.

For example, when starting a cold engine it is frequently the practice to maintain the engine throttle valve in a partially opened condition. This provides more rapid warm-up and smoother running during the warm-up phase. However, when the spark timing is interrelated with the throttle control, then the spark timing at warm-up will not be the appropriate spark timing.

It is, therefore, a principal object of this invention to provide an improved spark timing control for an internal combustion engine.

It is a further object of this control to provide a relatively simple and yet highly effective spark timing control for an engine wherein the spark timing may be optimally set during starting and warm-up conditions.

It is a further object of this invention to provide improved spark timing control and method for an engine for operation during starting and warm-up which will provide the desired degree of spark timing and regardless of the position of the throttle valve.

SUMMARY OF THE INVENTION

This invention is adapted to be embodied in an engine control system and method for a spark-ignited internal combustion engine that has at least one combustion chamber. An induction system is provided for delivering at least an air charge to the combustion chamber. A throttle valve is provided in the induction system for controlling the flow therethrough. A spark plug is provided for firing a charge in the combustion chamber. An ignition system is provided for firing the spark plug. The engine has an output shaft that is driven by combustion in the combustion chamber and the ignition system includes a pulser coil that is supported for movement on a timing plate and which is juxtaposed to the engine output shaft for generating a signal indicative of engine output shaft angle. Spark control means are provided for interrelating the movement of the timing plate and the throttle valve for changing the timing of the pulser coil output in response to the position of the throttle valve for maintaining the desired spark timing in relation to engine load.

In accordance with an apparatus for practicing the invention, means are provided for providing an indication of a condition when the position of the throttle valve will not be indicative of the desired spark timing. In response to this condition, another timing pulse is generated that is offset significantly from the normal timing pulse. Means are provided for calculating the optimum spark timing from engine conditions and counting means are employed for counting the timing from the other timing pulse until the desired timing. The spark plug is then fired at that desired timing.

In accordance with a method for practicing the invention, the engine running conditions are sensed and when it is determined that the engine running condition is not truly represented by the throttle valve position, another timing pulse is generated by the ignition system. Means are provided for determining the optimum timing for firing the spark plug. A count is begun when the other spark signal is given and the spark plug is fired at that optimum time after the other spark signal.

DETAILED DESCRIPTION OF THE PREFERRED EMBODIMENTS OF THE INVENTION

Figure 1:
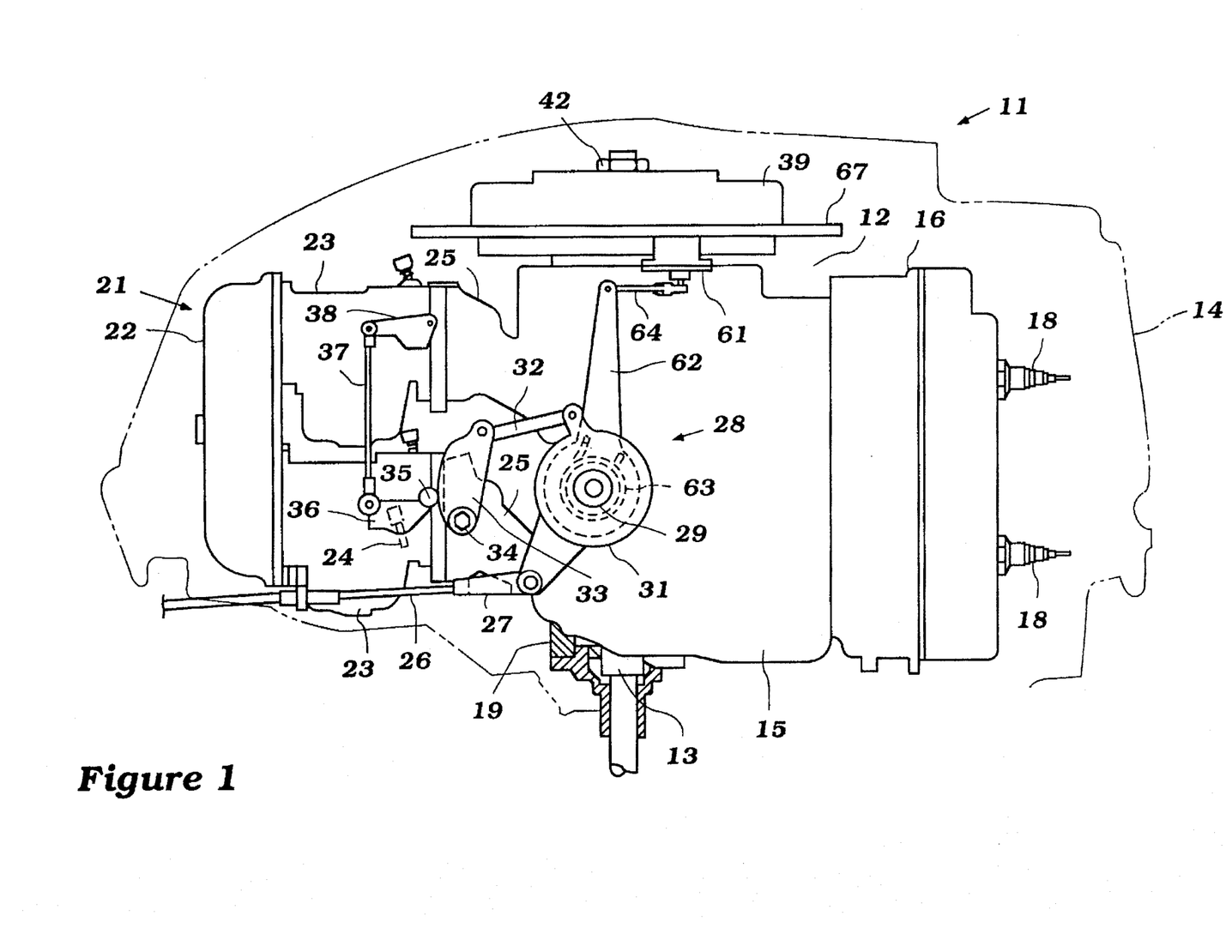
FIG. 1 is a partial side elevational view of a portion of an outboard motor constructed and operated in accordance with an embodiment of the invention, with the protective cowling shown in phantom and other portions broken away and shown in section.
Figure 2:
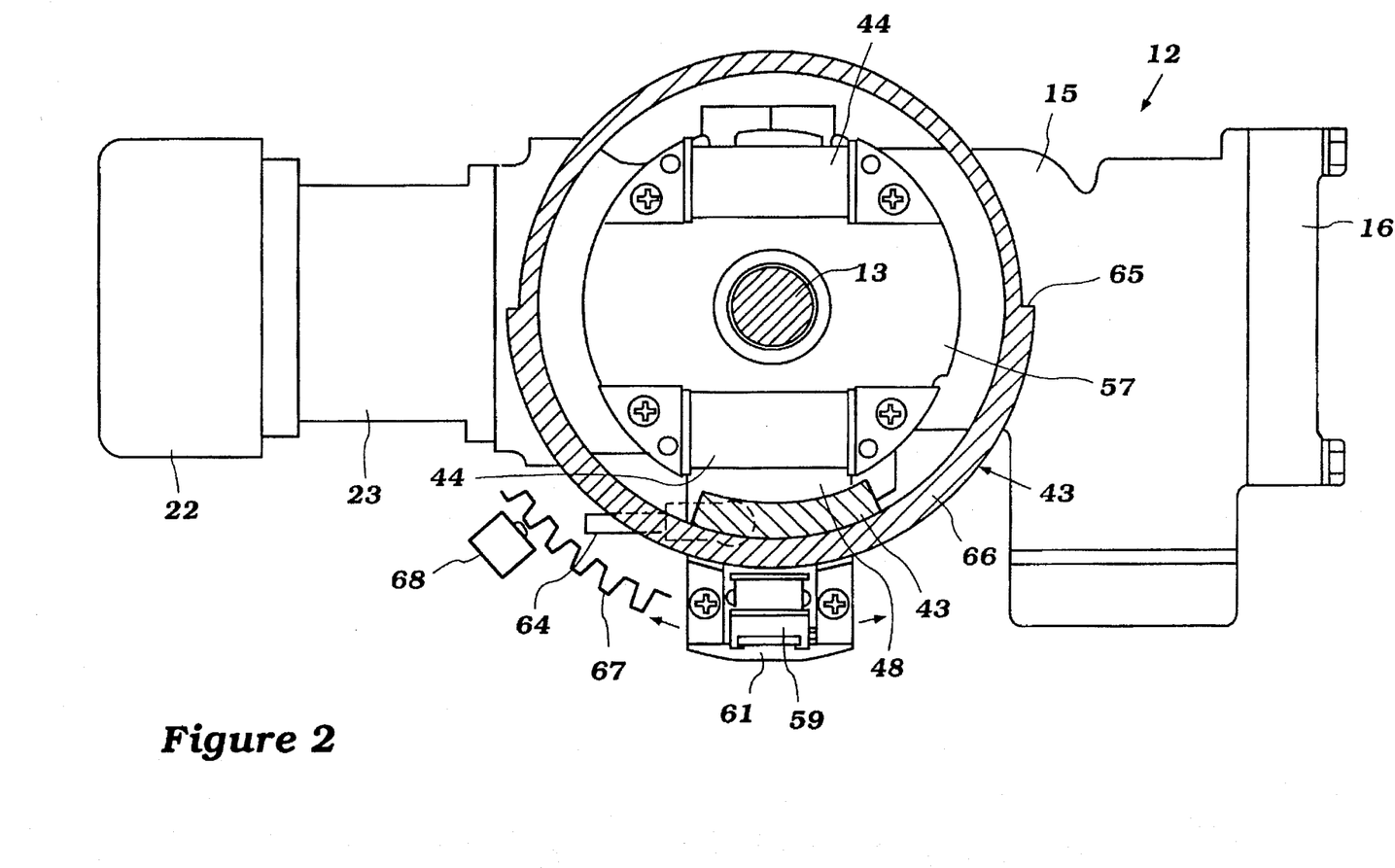
FIG. 2 is an enlarged top plan view of the outboard motor, with a portion of the flywheel magneto system broken away and shown in section.
Figure 3:
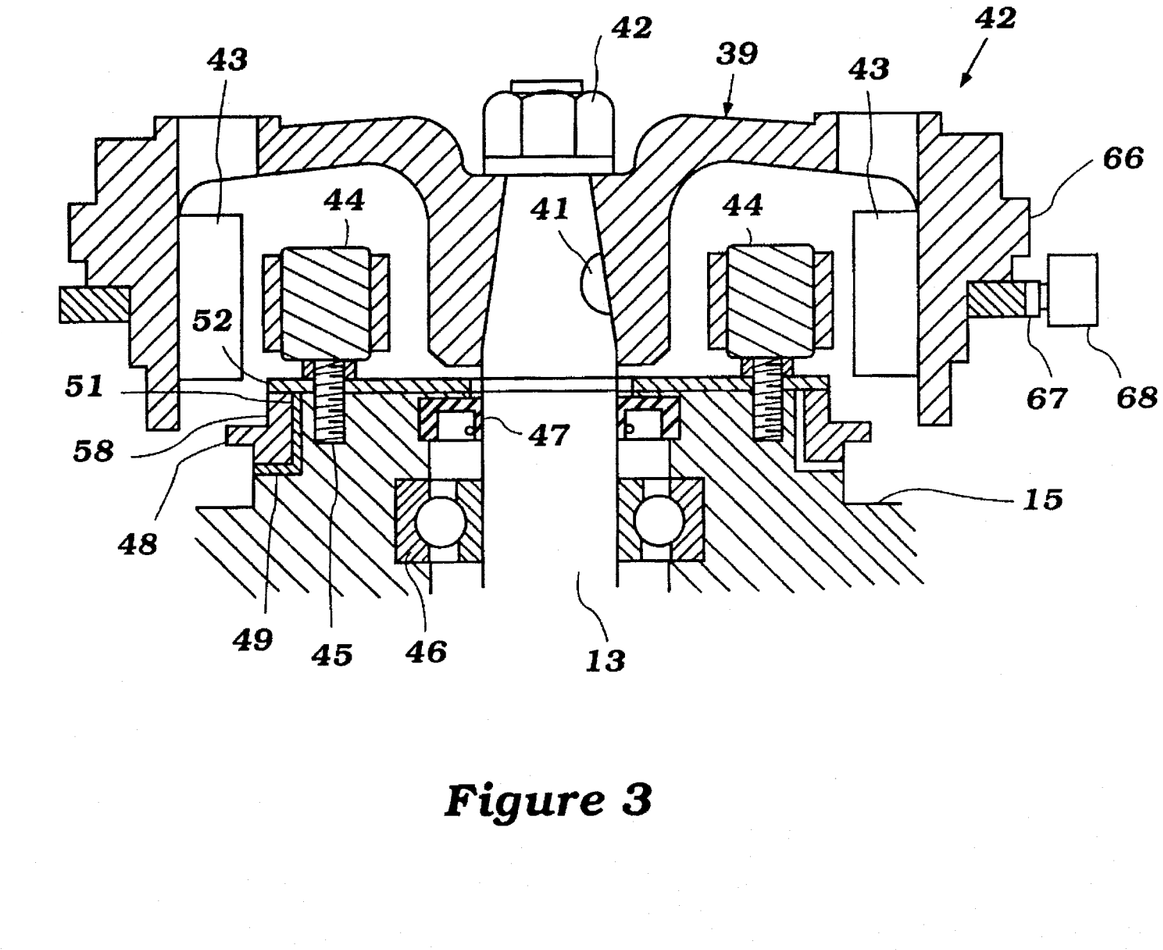
FIG. 3 is a further enlarged cross-sectional view taken through the timing mechanism of the flywheel magneto assembly.

Referring now in detail to the drawings and initially to FIGS. 1–3 and primarily initially to FIG. 1, an outboard motor constructed and operated in accordance with an embodiment of the invention is shown partially and is identified generally by the reference numeral 11. The invention is described in conjunction with an outboard motor because the invention has particular utility in setting the spark timing for two-cycle crankcase compression internal combustion engines. Such engines are frequently employed in conjunction with outboard motors and, therefore, the illustrated environment is one in which the invention may be typically found.

Although the invention is directed primarily to ignition control systems for such engines, it will be readily apparent to those skilled in the art that the invention may be practiced in conjunction with other types of engines, such as four-cycle, spark-ignited internal combustion engines. In addition, the particular configuration for the engine which will be described is to be considered only typical of those with which the invention may be employed. It will be readily apparent to those skilled in the art, how the invention can be employed with engines having other configurations.

The outboard motor 11 is comprised of a power head that consists of a powering internal combustion engine, shown primarily in side elevation in FIG. 1 and identified generally by the reference numeral 12. As is typical with outboard motor practice, the engine 12 is supported so that its output or crankshaft 13 rotates about a vertically extending axis. The power head is completed by a protective cowling which encircles the engine 12 and which is shown in phantom only in FIG. 1 and is identified by the reference numeral 14.

The vertical disposition of the engine output shaft 13 permits it to be coupled to a drive shaft (not shown) that extends vertically downwardly from the power head through a drive shaft housing and into a lower unit, neither of which is shown. In this lower unit, the drive shaft drives a propulsion device such as a propeller through a conventional forward/neutral/reverse transmission, as is well known in this art. Since the invention deals primarily with the engine 12 and the control therefore, the remaining components of the outboard motor are not illustrated and may be of any conventional nature.

The engine 12 includes a cylinder block 15 in which combustion chambers are formed by cylinder bores, pistons reciprocating in these cylinder bores and a cylinder head assembly 16 that is affixed to the cylinder block 15 in any known manner. Since the internal details of the engine 12 form no part of the invention, these components are not illustrated and will not be described any further. Again, those skilled in the art will readily understand how the engine 12 may be constructed in any type known in the prior art.

The pistons afore-referred to are connected by means of connecting rods to the crankshaft 13 for driving it. In the illustrated embodiment, the engine 12 is depicted as being of the two-cylinder in-line type and, therefore, a pair of spark plugs 18 are mounted in the cylinder head 16 and have their spark gaps extending into the combustion chambers. The spark plugs 18 are fired in a manner which will be described.

The crankshaft 13 rotates in a crankcase chamber formed by the cylinder block 15 and by a crankcase member 19 that is affixed thereto. As is typical with two-cycle crankcase compression engine practice, the individual crankcase chambers associated with each of the cylinder bores of the engine are sealed from each other in a known manner.

An induction system, indicated generally by the reference numeral 21 is provided for supplying a fuel air charge to these sealed crankcase chambers. This induction system includes an air inlet device 22 that draws atmospheric air from within the protective cowling 14 and delivers to a pair of charge formers such as carburetors 23. These carburetors 23 each have induction passages in which throttle valves 24 are positioned. The throttle valves 24 control the flow of air through the induction system 21 in a manner known in this art. The manner in which the throttle valves 24 are operated will be described later.

The carburetors 23, in turn, deliver the fuel air charge to a pair of intake manifolds 25 which, in turn, serve the individual crankcase chambers associated with each of the cylinder bores. This charge is admitted through reed type check valves so as to flow into the crankcase chambers when the volume therein is increasing and to permit the compression of the charge therein when the pistons move downwardly in the cylinder bores. As is well known, this compressed charge is then transferred to the combustion chambers through scavenge passages and is fired by the spark plugs 18.

The mechanism for controlling the position of the throttle valves 24 includes a bowden wire actuator 26 which is remotely operated by the operator of the outboard motor 11 in a known manner. This bowden wire actuator 26 is connected by means of a connector 27 to a spark and throttle control mechanism, indicated generally by the reference numeral 28 and which is mounted on the side of the cylinder block 15 by means of a pivot bolt 29.

A first throttle control lever 31 is connected directly to the bowden wire actuator 26 and, in turn, operates a throttle control link 32 to which it is pivotally connected at one end. This throttle control link 32 operates a throttle cam 33 that is pivotally mounted on one of the intake manifolds 25 by a pivot bolt 34. The throttle control cam 33 cooperates with a follower 35 that is affixed to a throttle control lever 36 associated with one of the carburetor throttle valves 24 for rotatably positioning it.

A timing link 37 interconnects the throttle control lever 36 of one of the carburetors 23 with a throttle control lever 38 of the remaining carburetor so that both throttle valves 24 will be operated in unison.

The throttle and spark control mechanism 28 also is coupled with the engine ignition system for controlling the time of firing of the spark plugs 18. This ignition system includes a flywheel magneto, indicated generally by the reference numeral 39, which is affixed to the upper end of the engine crankshaft 13 by means of a key 41 and retaining nut 42.

The flywheel magneto 39 carries a plurality of arcuately-shaped permanent magnets 43 which are spaced around the inner periphery of the flywheel magneto 39 in a manner as well known in this art. These permanent magnets cooperate with charging coils 44 that are mounted on the upper side of the cylinder block 15 by means of mounting posts 45. As the permanent magnets 43 rotate, an electrical charge will be generated in the charging coils 44 which are utilized to charge a battery (not shown) and also to provide a charge for the ignition system for charging a capacitor thereof, in the event a CDI ignition system is incorporated.

Mounted on the upper end of the cylinder block 15 upwardly of a bearing 46 which journals the crankshaft 13 and an adjacent seal 47 there is provided a timing ring or plate 48. This timing plate 48 is rotatably journaled by a means of a pair of plane bearings 49 and 51 and is held in place by means of a retainer plate 51 which is held in place by the threaded fasteners 45 for the charging coils 44. The timing plate 48 has a hub portion 58 that is journaled on the cylinder block 15 in a manner well know in this art.

A pulser coil 59 is mounted on an extending portion 61 of the timing plate 48 and is formed adjacent the outer periphery of the flywheel magneto 39. Each time a permanent magnet 43 passes the pulser coil 59 a pulse signal will be generated that is related to the angular position of the crankshaft 13, as should be readily apparent. This trigger pulse is employed for firing the spark plugs 18 in a manner well known in this art.

Figure 5:
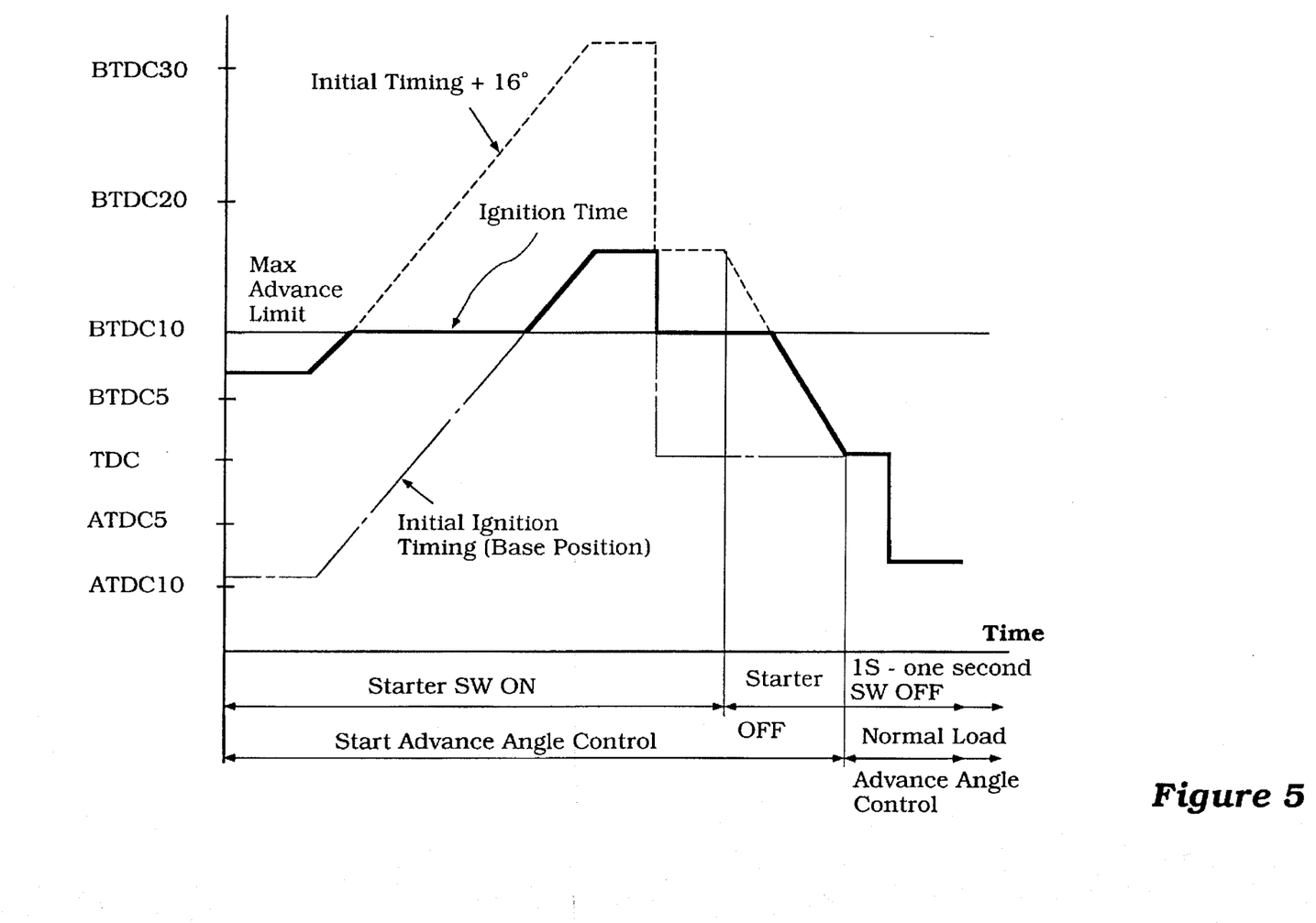
FIG. 5 is a graphical view showing how the spark timing varies with a conventional system and how the spark timing is controlled in accordance with the invention during start-up operation.

A throttle control lever 62 has a spring biased lost motion connection 63 with the throttle control lever 31. A link 64 pivotally connects the timing control lever 62 with the timing plate 48 so as to rotate it to an angular position that is dependent upon the position of the throttle valves 24. Conventionally, a system is employed wherein during initial rotation of the throttle valves 24 the spark timing is varied at a linear fashion up until a predetermined point. Thereafter, spark timing may be held fixed, increased at a decreasing rate or actually retarded depending upon the desired engine characteristics. Such conventional timing curves are shown in FIG. 5. For most engine running conditions, this system is totally effective.

However, when cold starting operation occurs, it is the normal practice to hold the throttle valve 24 in a partially opened position so as to provide quicker warm up. However, this will result in spark advance which is too premature and hence engine running will not be as smooth or as efficient as desired. Therefore, the ignition circuit is provided with an additional system whereby another timing technique is in employed during this cold start up operation. This additional system is comprised of a means that provides a surface discontinuity 65 on the flywheel magneto surface 66 which will generate a pulse signal in the pulser coil 59 that is well retarded from the conventional timing signal and regardless of the angular position of the timing plate 48.

In addition, there is provided a starter gear 67 on the flywheel magneto 43 that cooperates with a starter motor for engine starting. This starter gear 66 is associated with a further pulser coil 68 which will output a signal each time one of the teeth of the starter gear 67 passes and thus provide an indication of actual angular position of the crankshaft. This system coupled with the surface continuity 65 is employed for controlling spark advance during cold starting and cold warm up, as will become now apparent.

Figure 4:
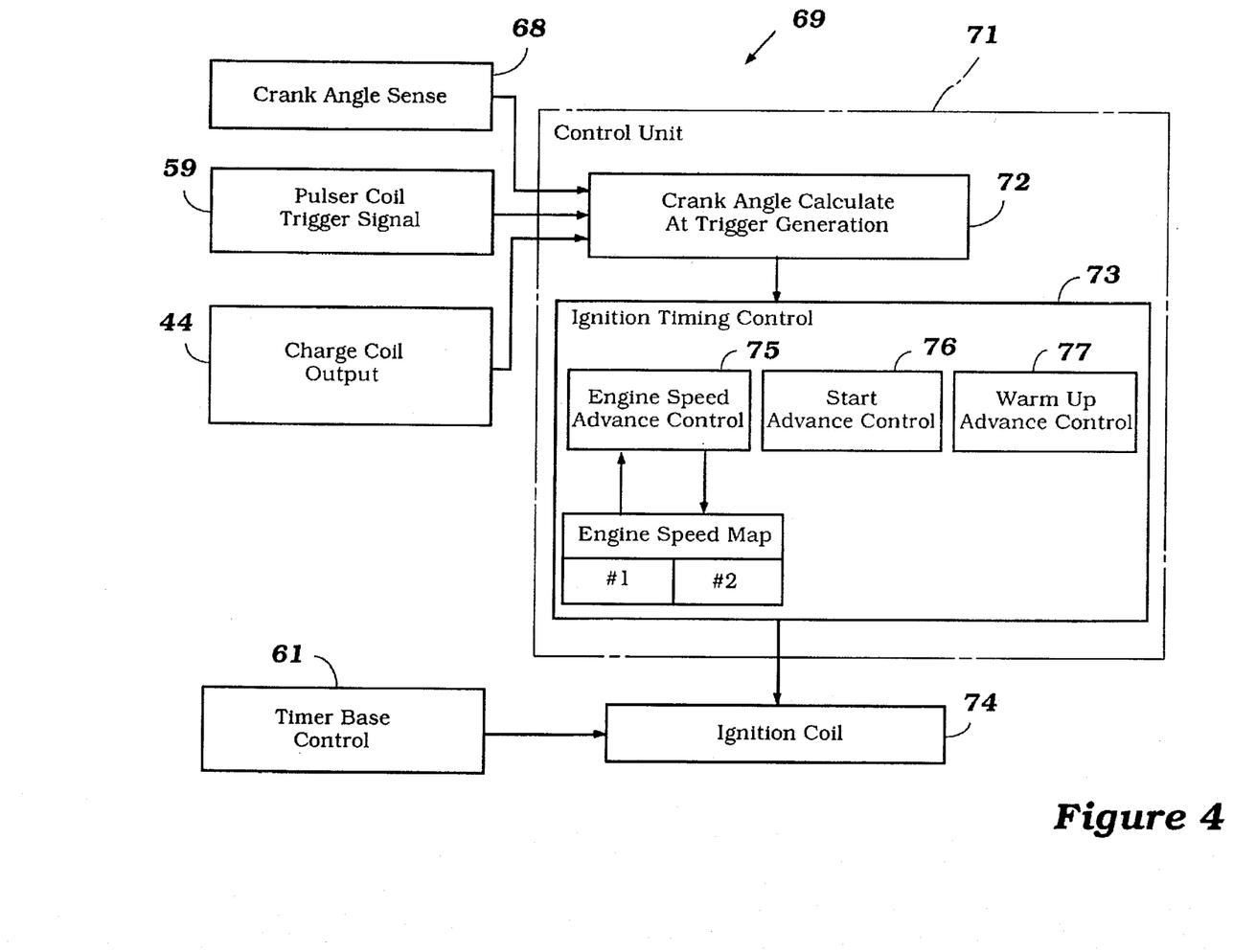
FIG. 4 is a schematic view showing the interrelationship of the components of the spark advance system.

Basically the way the system operates is that the spark timing, controlled by an ignition circuit indicated schematically in FIG. 4 by the reference numeral 69 and which has a control unit 71 provides spark timing based upon the function of the location of the timer plate and specifically the pulser coil trigger signal during normal engine running. However, during starting and during initial warm up, the alternate output of the pulser coil 59 caused by the surface discontinuity 65 is employed for controlling the spark timing.

This is because the spark timing would be too far advanced if the position of the pulser coil 59 were employed for spark timing as may be seen in the broken line view of FIG. 5. It will be seen that the normal advance position of the throttle during warm up would call for a spark advance 16° before normal or as much as 30° before top dead center and this would not permit good starting.

Therefore, under starting conditions the alternate output generated by the pulser coil 59 is employed for initiating a time interval from which spark timing is calculated. A look up map is employed for setting the optimum spark timing and then the output from the crank angle sensor 68 is processed by the control unit 71 and specifically by a crank angle calculating section 72 which outputs the actual crank angle at the time of the trigger signal.

This signal is then transmitted to the ignition timing control circuit 73 wherein the actual timing of firing of the spark plugs 1 and 2 is determined and the spark coil, indicated schematically at 74 associated with each spark plug is fired at the appropriate crank angle. There are a number of maps preprogrammed into the ignition timing control 73 and these include an engine speed advance control map 75, a start advance control map 76 and a warm up advance control map 77. These maps will be described later in more detail when the actual routine is described.

Referring now to FIG. 5, this figure shows in dot-dash line the normal ignition timing curve with respect to time as the engine is run through a cycle. In accordance with the invention, the spark timing which would exist during fast idle and which might be as much as 30° top dead center is limited to a maximum starting angle, for example, 10° before top dead center during the time when the starter motor is operated. This timing control is limited up until approximately one second after the starter motor is stopped cranking and during this time period the spark advance is set by engine temperature.

Thereafter, the program moves to normal spark advance control dependent upon the position of the pulser coil, which, as has been noted, depends upon throttle valve position. In this way, the spark advance can be accurately controlled and will be set optimum for all conditions including cranking and cold warm up.

Figure 6:
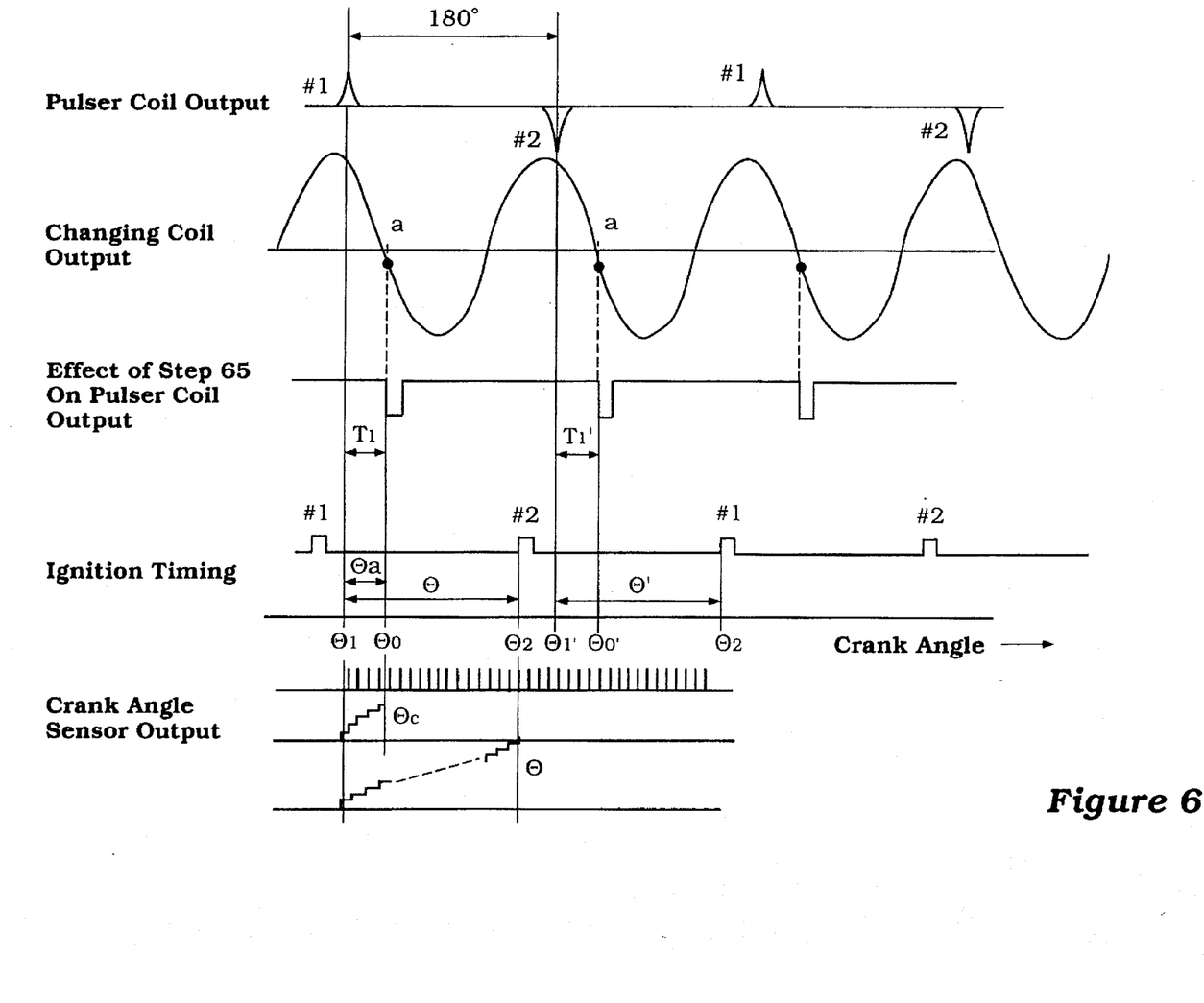
FIGS. 6A–6E are a graphical view showing certain output signals from the ignition system components and depicts how the optimum spark timing is set during start-up.

The way the spark advance is controlled during this time period may be understood by reference to the graphical view of FIG. 6. In this figure, the output of the pulser coil is shown at a. and the output of the charging coil is shown at b. The surface discontinuity 65 on the flywheel causes a pulse to be generated when it passes the pulser coil at the point in time a with these pulses being shown respectively at T1, T1', etc. The firing of the actual ignition timing is indicated at curve d. The pulser outputs from the pulser coil 68 are shown by the curve e.

Basically, when operating at the start up conditions, the normal output of the pulser coil is ignored and the output pulse T1 when the discontinuity 65 passes the pulser coil 59 is employed to start a fixed timing interval for determining the time θ when the spark plug should be next fired. This time θ is determined by the difference between the total angle and the angle θa when the pulser coil alternate output pulse is received. In order to measure the crank angle to fire the spark plug at the appropriate time, the pulser signal outputs from the pulser coil 68 are summed until the angle θ is reached and then the spark plug is fired.

Figure 7:
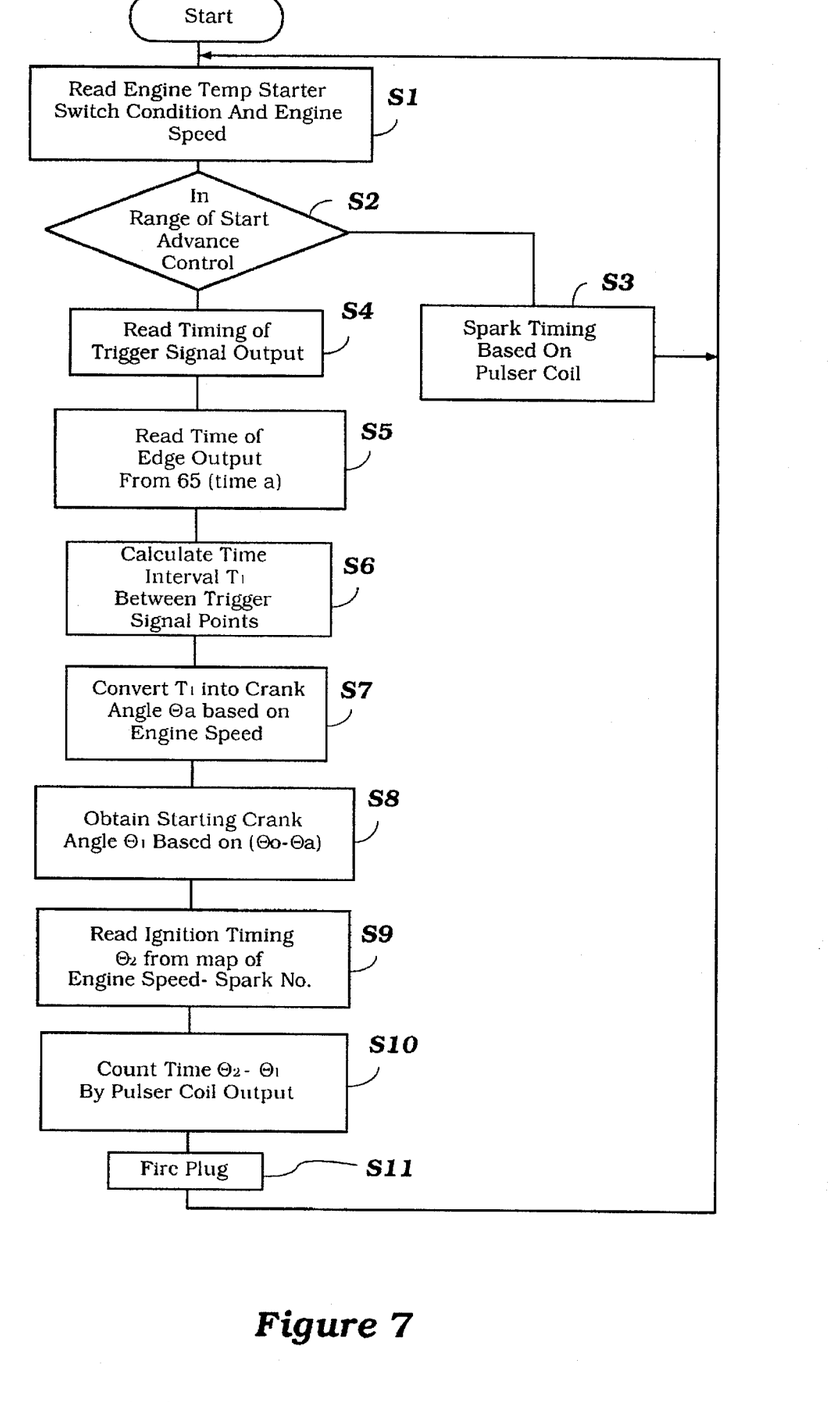
FIG. 7 is a block diagram showing the control routine for setting the spark timing.

The actual control routine by which the system operates will now be described by primary reference to FIG. 7. Once the program starts, it moves to the Step S1 so as to read certain conditions, specifically, the engine temperature from an engine temperature, the condition of the engine starter switch and also the engine speed. The program then moves to the Step S2 to determine if the engine operation is in the start advance control range. This condition exists when the starter switch has been turned on and is still within the time period of one second from its being discontinued. In order words, if the engine is in the starting mode, the program will progress to the Step S4 to execute the starting mode control. If, however, the engine is no longer in the starting mode, then the program moves to the Step S3 to provide normal spark timing based upon the normal pulser output signals solely.

If, however, the engine has been determined to be in the starting advance control range at the Step S2, the program then moves to the Step S4 so as to read the crank angle at which the pulser coil 59 outputs its signal. The time at which the pulser coil 59 outputs its signal and the crank angle is read is labelled T1 in FIG. 6.

The program then moves to the Step S5 so as to read the time when the edge 65 of the flywheel passes the pulser coil 59 and give the output pulse indicated at Curve C illustrated in FIG. 6 The time at which the edge 65 of the flywheel passes the pulser coil 59 is labelled point A in FIG. 6. This time is at a time interval $T_1$ after the time when the pulser coil has output its normal signal.

The program then moves to the Step S6 so as to actually compute the time interval T1 between the output of the pulser coil and the time when the step on the flywheel passes the pulser coil 59. The program then moves to the Step S7 so as to convert the time period T1 into a crank angle θa based upon the engine speed. The program then moves to the step S8 so as to determine the actual crank angle $\theta_1$ at which the pulser coil outputs its normal signal, and this is determined by subtracting from $\theta_0$ the value θa.

The program then moves to the step S9 to read from a look-up table for engine speed and appropriate advance angle, this table being that map or table referred to previously at 75 in FIG. 4. This is the advance angle for the warm-up or start control. The program then moves to the step S9 to count the crank angle sensor pulses from the crank angle sensor 68 until the time $\theta_2$ is reached. Then the program moves to the step S11 so as to fire the spark plug. This program is repeated during the warm-up mode, as should be readily apparent.

Also, it may be that at the step where the appropriate spark timing is set that this spark timing will be a timing based upon engine temperature. As may be seen in the following chart, optimum spark timing for ambient temperature is also determined during the start-up mode so that the spark angle will be appropriate for the engine temperature:

| Engine Temp | Spark Advance |
| --- | --- |
| −5° C. or lower | +14° |
| −5° C. | +14° |
| 10° C. | +9° |
| 25° C. | +5° |
| 35° C. | standard advance at 9° |
| 35° C. or higher | standard advance at 9° |

Thus, from the foregoing description, it should be readily apparent that the described spark advance mechanism provides a very simple and yet highly effective way that the spark timing can be set optimum for the start-up mode of an internal combustion engine. This is done even though the actual spark advance timing set by the manual spark advance will be inappropriate for the running condition. However, switch over to normal control is easily accomplished once the starting routine is over.

Of course, it will be readily apparent to those skilled in the art that the foregoing description is that of the preferred embodiment of the invention. Various changes and modifications may be made without departing from the spirit and scope of the invention, as defined by the appended claims.

What is claimed is:

1. An engine control system for a spark-ignited internal combustion engine having at least one combustion chamber, an induction system for delivering at least an air charge to said combustion chamber, a throttle valve in said induction system for controlling the flow therethrough, a spark plug for firing a charge in said combustion chamber, an ignition system for firing said spark plug, an engine output shaft driven by combustion in said combustion chamber, said ignition system comprising a pulser coil supported for movement on a timer plate and juxtaposed to said engine output shaft for generating a first timing signal indicative of engine output shaft angle, speed controlling means for inter-relating the movement of said timing plate and said throttle valve for changing the timing of said pulser coil output in response to the position of said throttle valve, means for providing an additional timing signal having an angle differing from that of the first timing signal generated by said pulser coil at that same time, means for sensing an engine condition when spark timing should not be determined by the position of the speed control means, and means for computing an alternate spark timing from said additional spark timing signal under such engine conditions.

2. The engine control system of claim 1, wherein the engine is provided with starting means and starter switch means for operating said starting means and wherein the alternate spark timing is utilized during the time when the starter switch is turned on.

3. The engine control system of claim 2, wherein the alternate spark timing is followed for a given time period after the starter switch is turned off.

4. The engine control system of claim 1, wherein the alternate spark timing is chosen from a map of certain engine conditions.

5. The engine control system of claim 4, wherein the map of engine conditions includes a map of engine speed.

6. The engine control system of claim 4, wherein the map of engine conditions comprises a map of spark timing versus engine temperature.

7. The engine control system of claim 1, wherein the pulser is associated with a flywheel magneto and the additional spark timing signal is given by forming a discontinuity on the periphery of said flywheel.

8. The engine control system of claim 7, wherein the discontinuity is formed at a point after the pulser coil is normally triggered.

9. An engine control method for a spark-ignited internal combustion engine having at least one combustion chamber, an induction system for delivering at least an air charge to said combustion chamber, a throttle valve in said induction system for controlling the flow therethrough, a spark plug for firing a charge in said combustion chamber, an ignition system for firing said spark plug, an engine output shaft driven by combustion in said combustion chamber, said ignition system comprising a pulser coil supported for movement on a timer plate and juxtaposed to said engine output shaft for generating a first timing signal indicative of engine output shaft angle, speed controlling means for inter-relating the movement of said timing plate and said throttle valve for changing the timing signal angle of said pulser coil output in response to the position of said throttle valve, said method comprising the steps of providing an additional timing signal having an angle which differs substantially from the angle of the first timing signal generated by said pulser coil at that same time, sensing an engine condition when spark timing should not be determined by the position of the speed control means, and computing an alternate spark timing from the additional spark timing signal under such engine conditions.

10. The engine control method of claim 9, wherein the engine is provided with starting means and starter switch means for operating said starting means and wherein the alternate spark timing is utilized in response to the starter switch being turned on.

11. The engine control method of claim 10, wherein the alternate spark timing is followed for a given time period after the starter switch is turned off.

12. The engine control method of claim 9, wherein the alternate spark timing is chosen from a map of certain engine conditions.

13. The engine control method of claim 12 wherein the map of engine conditions includes a map of engine speed.

14. The engine control method of claim 12, wherein the map of engine conditions comprises a map of spark timing versus engine temperature.

15. The engine control method of claim 9, wherein the pulser coil is associated with a flywheel magneto and the other spark timing signal is given by forming a discontinuity on the periphery of the flywheel.

16. The engine control method of claim 15, wherein the discontinuity is formed at a point after the pulser coil is normally triggered.

* * * * *

UNITED STATES PATENT AND TRADEMARK OFFICE
CERTIFICATE OF CORRECTION

PATENT NO. : 5,653,208
DATED : August 5, 1997
INVENTOR(S) : Kazuhiro Nakamura

It is certified that error appears in the above-identified patent and that said Letters Patent is hereby corrected as shown below:

Claim 7, column 8, line 30, should be corrected from "pulser is" to -- pulser coil is --.

Signed and Sealed this

Fifteenth Day of September, 1998

Attest:

BRUCE LEHMAN

*Attesting Officer*  Commissioner of Patents and Trademarks